(12) United States Patent
Cocchi et al.

(10) Patent No.: US 11,344,044 B2
(45) Date of Patent: May 31, 2022

(54) MACHINE FOR MAKING LIQUID OR SEMI-LIQUID FOOD PRODUCTS HAVING A SPATULA DRIVEN TO HAVE FIRST AND SECOND MOVEMENTS INDEPENDENT OF ONE ANOTHER

(71) Applicant: ALI GROUP S.r.l.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul Naviglio (IT)

( * ) Notice: Subject to any disclaimer, the term of this patent is extended or adjusted under 35 U.S.C. 154(b) by 425 days.

(21) Appl. No.: 16/401,639

(22) Filed: May 2, 2019

(65) Prior Publication Data

US 2019/0343145 A1 Nov. 14, 2019

(30) Foreign Application Priority Data

May 14, 2018 (IT) .......................... 102018000005330

(51) Int. Cl.
*A23G 9/12* (2006.01)
*A23G 9/22* (2006.01)
(Continued)

(52) U.S. Cl.
CPC .............. *A23G 9/12* (2013.01); *A23G 9/224* (2013.01); *A23G 9/228* (2013.01); *B01F 29/83* (2022.01); *B01F 35/92* (2022.01)

(58) Field of Classification Search
CPC .......... A23G 9/12; A23G 9/224; A23G 9/228; A23G 9/106; A23G 9/22; A23G 9/08;
(Continued)

(56) References Cited

U.S. PATENT DOCUMENTS 4,357,112 A * 11/1982 Davis ................... A23G 3/0221
366/149
4,583,863 A * 4/1986 Pandolfi ................... A23G 9/12
366/149
(Continued)

FOREIGN PATENT DOCUMENTS

DE 3921115 A1 * 1/1991
EP 2266418 A1 12/2010
(Continued)

OTHER PUBLICATIONS

Italian Search Report dated Jan. 16, 2019 from counterpart Italian App No. IT201800005330.

*Primary Examiner* — Charles Cooley
(74) *Attorney, Agent, or Firm* — Shuttleworth & Ingersoll, PLC; Timothy Klima

(57) ABSTRACT

A machine for making liquid or semi-liquid food products is provided with a frame, a product processing unit and a control unit for driving the processing unit; the processing unit is in turn provided with a first vessel which is set in rotation about its central axis by a brushless gear motor and which defines inside it a product processing chamber, a stirrer provided with a spatula mounted inside the processing chamber, and a movement unit for moving the stirrer; the movement unit for moving the stirrer imparts to the spatula, through two distinct linear actuators, a first movement, towards and away from the bottom of the first vessel, and a second movement, independent of the first, towards and away from the inside wall of the first vessel.

7 Claims, 5 Drawing Sheets

(51) Int. Cl.
*B01F 35/92* (2022.01)
*B01F 29/83* (2022.01)

(58) Field of Classification Search
CPC ... A23G 9/227; B01F 7/00208; B01F 7/1605; B01F 15/065; B01F 7/1655; B01F 9/12; B01F 27/805; B01F 27/091; B01F 27/83; B01F 29/83; B01F 35/92; A47J 43/07
USPC .............................................. 62/544; 366/149
See application file for complete search history.

(56) References Cited

U.S. PATENT DOCUMENTS

| | | | | |
|---|---|---|---|---|
| RE32,159 | E * | 5/1986 | Davis | A23G 3/0221 366/149 |
| 4,655,605 | A * | 4/1987 | Cipelletti | B01F 7/001 366/149 |
| 4,692,029 | A * | 9/1987 | Davis | A23G 9/14 366/149 |
| 4,773,233 | A * | 9/1988 | Kawasumi | A23G 9/12 62/340 |
| 4,827,732 | A * | 5/1989 | Suyama | A23G 9/12 62/155 |
| 4,838,702 | A * | 6/1989 | Torimitsu | A23G 9/228 366/144 |
| 5,927,098 | A * | 7/1999 | Lee | A23G 9/12 62/342 |
| 6,533,838 | B1 * | 3/2003 | Yamamura | C22B 9/02 75/688 |
| 10,820,609 | B2 * | 11/2020 | Cocchi | A23G 9/106 |
| 2016/0255858 | A1 | 9/2016 | Noth et al. | |
| 2019/0069573 | A1 * | 3/2019 | Cocchi | A23G 9/22 |
| 2019/0343145 | A1 * | 11/2019 | Cocchi | A23G 9/106 |
| 2022/0030906 | A1 * | 2/2022 | Springer | A23G 9/28 |

FOREIGN PATENT DOCUMENTS

| | | |
|---|---|---|
| EP | 2524603 A1 | 11/2012 |
| EP | 3159632 A1 | 4/2017 |
| GB | 479251 A | 2/1938 |
| GB | 1323538 A | 7/1973 |

* cited by examiner

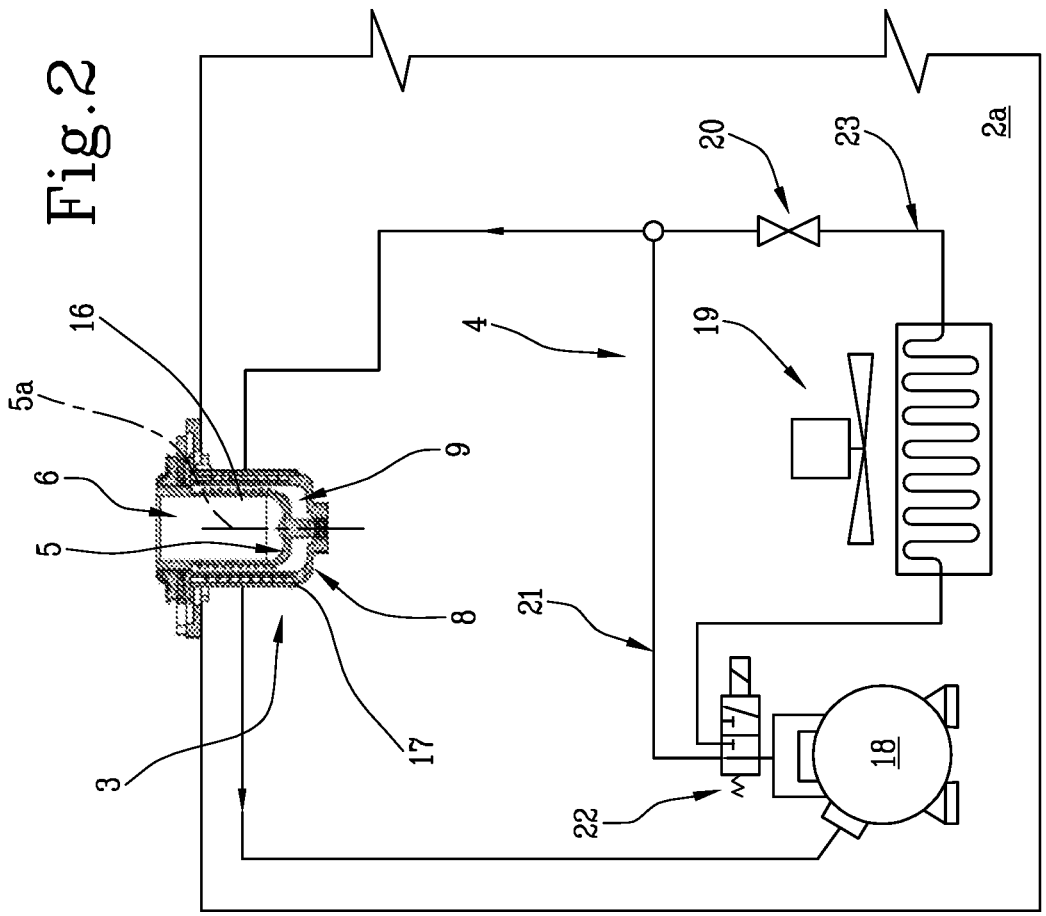
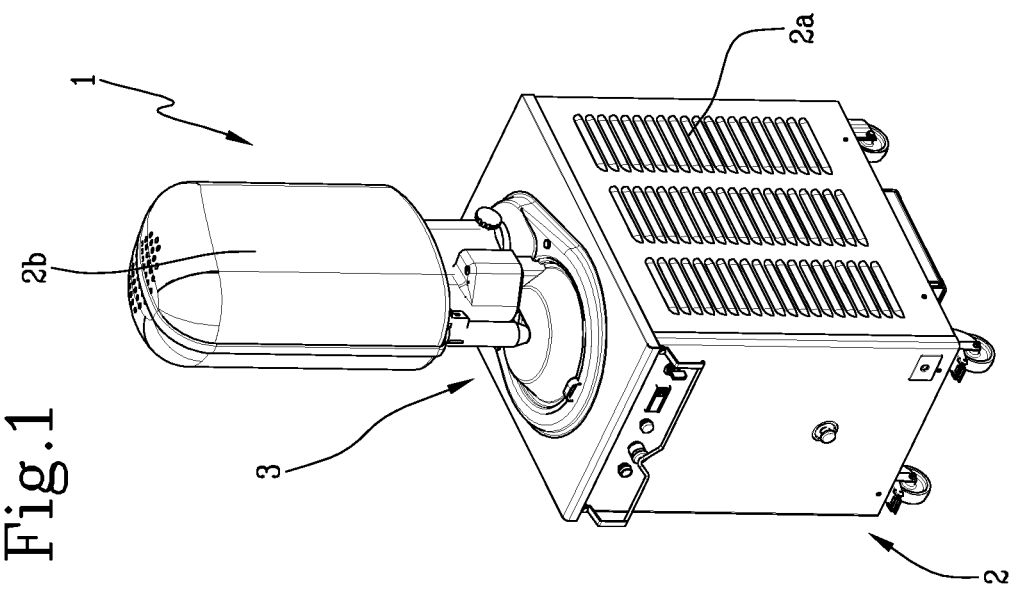

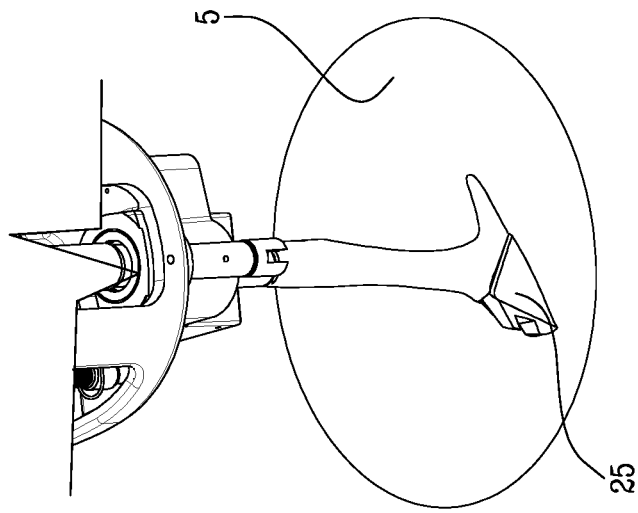
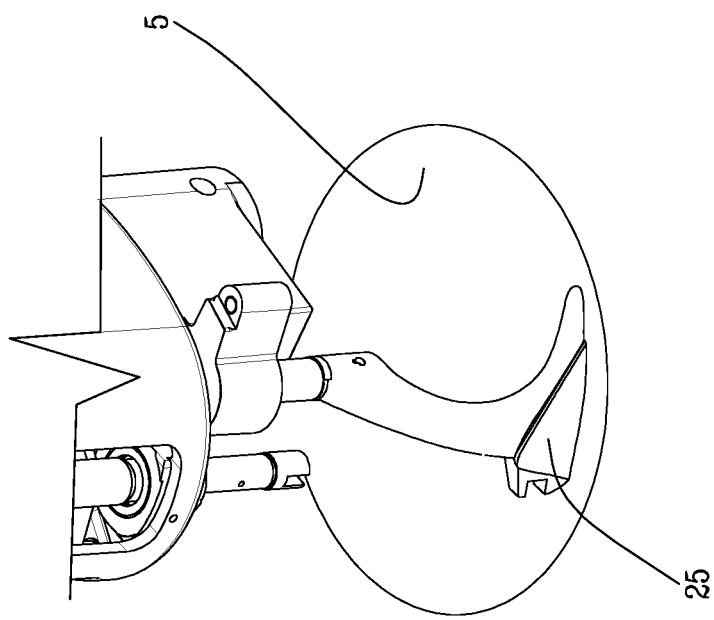

MACHINE FOR MAKING LIQUID OR SEMI-LIQUID FOOD PRODUCTS HAVING A SPATULA DRIVEN TO HAVE FIRST AND SECOND MOVEMENTS INDEPENDENT OF ONE ANOTHER

This application claims priority to Italian Patent Application 102018000005330 filed May 14, 2018, the entirety of which is incorporated by reference herein.

BACKGROUND OF THE INVENTION

This invention relates to a machine for making food products (preferably liquid or semi-liquid), in particular of the sectors of ice cream (gelato, sorbets, soft ice cream, etc.), bakery and confectionery (custard and chocolate creams, etc.) or catering (savory soups, etc.).

Hereinafter, for convenience of description and without losing in generality, reference will be made to the ice cream sector, in which there is a strongly felt need to be able to make artisanal products in small quantities in very short spaces of time and in a variety of types and flavors able to meet the requirements of customers.

This need involves the designing of simple, versatile machines intended for making a variety of products alternately in terms of their ingredients, with a view to providing leading edge tools rooted in tradition and capable of obtaining results similar to those of a traditional artisanal business.

Consequently, a first particularly strongly felt need is that for a machine that allows setting a specific cycle for processing the ingredients according to their composition and/or according to the type of product to be made (gelato, sorbet, soft ice creams, etc.).

At the same time, another need felt in the trade is that for a machine which can combine easy, low-cost maintenance with the guarantee of high quality ice cream production.

SUMMARY OF THE INVENTION

This invention has for an aim to provide a machine for making liquid or semi-liquid food products which allows easily and effectively optimizing the process cycle according to ingredient composition, that is to say, according to the product to be made.

Another aim of this invention is to provide a machine for making liquid or semi-liquid food products which allows easy, low-cost maintenance and which can guarantee quality and food safety of the products made.

According to the invention, these aims are achieved by a machine for making liquid or semi-liquid food products and comprising the technical features set out in one or more of the appended claims.

BRIEF DESCRIPTION OF THE DRAWINGS

The technical features and advantages of the invention are more apparent from the detailed description which follows, with reference to the accompanying drawings which illustrate a preferred, non-limiting embodiment, and in which:

FIG. 1 shows a machine for making liquid or semi-liquid food products made according to this invention;

FIG. 2 schematically illustrates a thermal unit of the machine of FIG. 1;

FIGS. 6 and 7 illustrate a detail of the machine of FIG. 1 in respective operating positions.

DESCRIPTION OF THE PREFERRED EMBODIMENTS

Figure 3:
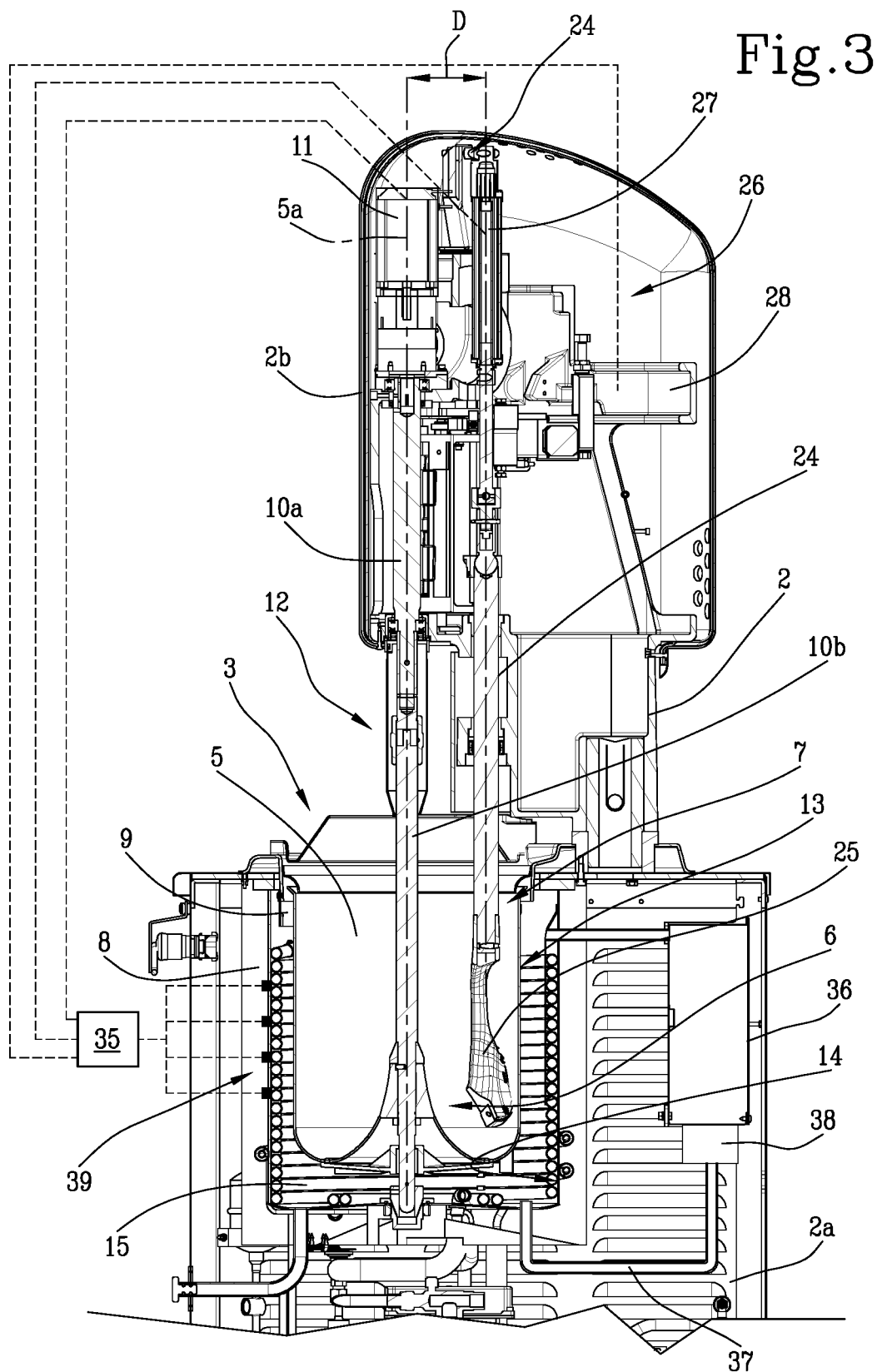
FIG. 3 shows some of the component parts of the machine of FIG. 1 partly in cross section and partly schematically.

The numeral 1 in FIG. 1, denotes in its entirety a machine for making liquid or semi-liquid food products served both hot and cold. More specifically, the machine 1 is capable of making gelato, sorbets, soft ice cream, etc. for the ice cream trade, custard and chocolate creams, etc. for the bakery and confectionery trade and savory soups and the like for the catering trade.

The machine 1 comprises a frame 2 on which a unit 3 for processing the product is mounted and which houses a thermal unit 4 based on a thermodynamic cycle (FIG. 2).

Looking in more detail, the thermal unit 4 is housed in a bottom portion of the frame 2 enclosed in a parallelepiped shaped guard 2a provided with ventilation openings.

As shown in more detail in FIG. 3, the processing unit 3 comprises: a first vessel 5 which defines inside it a product processing chamber 6; a stirrer 7 mounted in use at least partly inside the chamber 6; and a second vessel 8 which defines inside it a housing chamber 9 to accommodate the first vessel 5.

Both the processing chamber 6 and the housing chamber 9 are substantially cylindrical.

The vessel 5 is housed coaxially and removably inside the vessel 8, which is mounted fixedly on the frame 2 inside the guard 2a.

Also, the vessel 5 is housed rotatably inside the vessel 8 and is driven in rotation about its central axis 5a by a drive shaft 10a of a brushless motor (gear motor)

The shaft 10a is coupled in axial alignment with a central rod 10b of the vessel 5 which extends along the axis 5a from the bottom of the vessel 5 to beyond the loading edge thereof.

The coupling between the shaft 10a and the rod 10b is secured by a coupling member 12, preferably of the quick disconnect type.

The axis of rotation 5a common to the vessel 5, the shaft 10a and the rod 10b is disposed vertically.

The gear motor 11 is mounted on a top portion of the frame 2, enclosed within an auxiliary, cap shaped guard 2b.

In use, that is to say, when the vessel 5 is housed inside the vessel 8, a gap 15 containing a heat exchanger fluid is defined between the outside wall 13 of the vessel 5 and the inside wall 14 of the vessel 8.

Preferably, but not necessarily, the heat exchanger fluid is glycol or a glycol mixture.

The outside wall 13 of the vessel 5 is provided with a spiral channel 16 (FIG. 2) whose purpose is to improve heat transfer from the heat exchanger fluid to the processing chamber 6.

Alternatively, the bottom of the vessel 5 is provided with one or more blades whose purpose is to produce a turbulent state which improves heat exchange.

In other words, according to one aspect, the one or more blades are driven in rotation as one with the vessel 5 (preferably, but not necessarily, they are coupled to the vessel 5) in order to produce in the heat exchanger fluid (interposed between the vessels 5 and 8) a turbulent state which can improve heat exchange.

In effect, when the vessel 5 is set in rotation by the gear motor 11, the channel 16 imparts a spiral stirring motion to the heat exchanger fluid in the gap 15, thereby enhancing heat exchange efficiency.

The heat exchanger fluid is cooled or heated by the thermal unit 4 through the inside wall 14 of the vessel 8, which is in turn cooled or heated by a fluid coil 17 of the thermal unit 4.

The coil 17 is preferably, but not necessarily, defined by a spiral channel embedded in the side wall of the vessel 8 and is traversed by a heat exchanger fluid (FIG. 2).

It should be noted, therefore, that cooling or heating the product inside the vessel 5 is accomplished by two fluids: namely a (first) heat exchanger fluid (glycol), constituting a liquid bath in the gap 15, and a (second) heat exchanger fluid, which exchanges heat with the first heat exchanger fluid through the wall of the vessel 8.

Besides the coil 17, the thermal unit 4 preferably comprises a compressor 18, a heat exchanger 19 and a pressure reducing element 20 for reducing the pressure of the heat exchanger fluid.

The thermal unit 4 also comprises a bypass branch 21 designed to allow the heat exchanger fluid to circulate between the compressor 18 and the coil 17 to produce a thermodynamic, hot gas cycle.

In this cycle, the heat exchanger fluid is heated in the compressor 18 and transfers heat to the coil 17, thereby heating the heat exchanger fluid contained in the gap 15 and hence the product contained in the processing chamber 6 of the vessel 5.

The thermal unit 4 may further comprise a switch 22, provided with one or more valves, for example, and configured to connect an outlet of the compressor 18 respectively and alternately:
A) to the bypass branch 21 (and thus to the inlet of the coil 17);
B) to a branch 23 affected by the heat exchanger 19 and the pressure reducing element 20.

Thus, in the A configuration, a hot gas thermodynamic cycle is performed to allow heating the heat exchanger fluid (glycol), hence the product being processed, whilst in the B configuration, a thermodynamic, refrigerating cycle is performed, during which the heat exchanger fluid in the coil 17, which in this case acts as an evaporator, expands and thus allows cooling the product inside the vessel 5.

It should be noted that the thermal unit 4 may or may not include the bypass branch 21 and the switch 22, which are optional.

The aforementioned stirrer 7 comprises a driven rod 24 and a spatula 25 fixed to the bottom end of the driven rod 24.

The driven rod 24 extends in parallel with the assembly made up of the shaft 10a and the rod 10b, with its central axis 24a disposed at a predetermined distance D from the axis 5a.

The spatula 25 extends eccentrically from the bottom end of the driven rod 24.

The top end of the rod 24 is coupled to the movement unit 26 which imparts to the spatula 25 two movements independent of each other, specifically a first movement, towards and away from the bottom of the vessel 5, and a second movement, towards and away from the inside wall of the vessel 5.

The first movement is a vertical linear movement, imparted by a translation of the driven rod 24 along the axis 24a.

The second movement is an eccentric oscillating movement imparted by an oscillation of the driven rod 24 about the axis 24a.

The translation of the driven rod 24 along the axis 24a is imparted by a first linear actuator 27 of the movement unit 26.

Preferably, the translation of the driven rod 24 along the axis 24a is imparted directly by the first linear actuator 27, whose driving end has a ball joint that presses the top end of the driven rod 24.

The first linear actuator 27 is housed in the guard 2b near the gear motor 11.

The oscillation of the driven rod 24 about the axis 24a is imparted by a second linear actuator 28 of the movement unit 26.

The second linear actuator 28 is also housed in the guard 2b.

Figure 4:
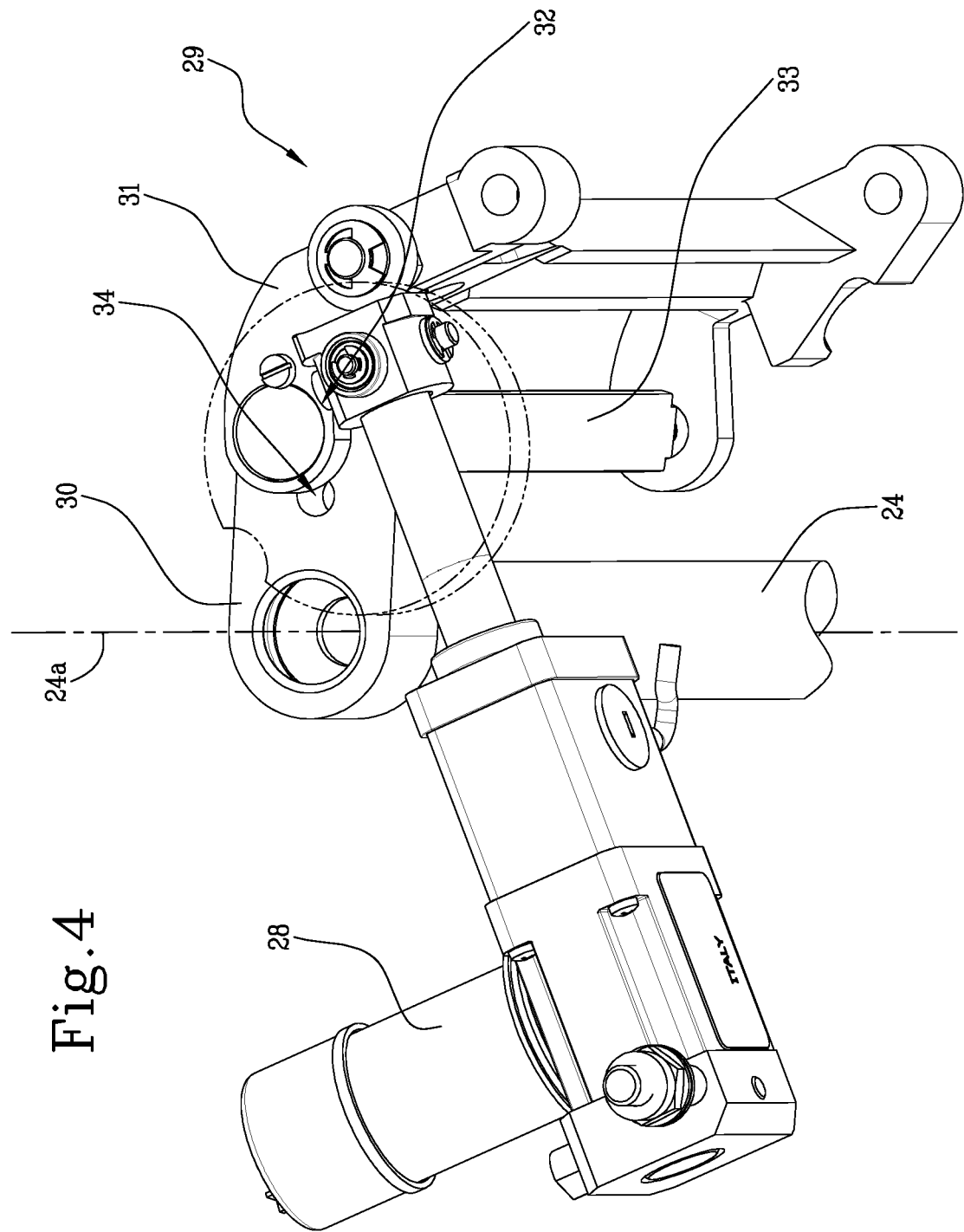
FIG. 4 illustrates a detail of the machine of FIG. 1, with some parts cut away for clarity.
Figure 5:
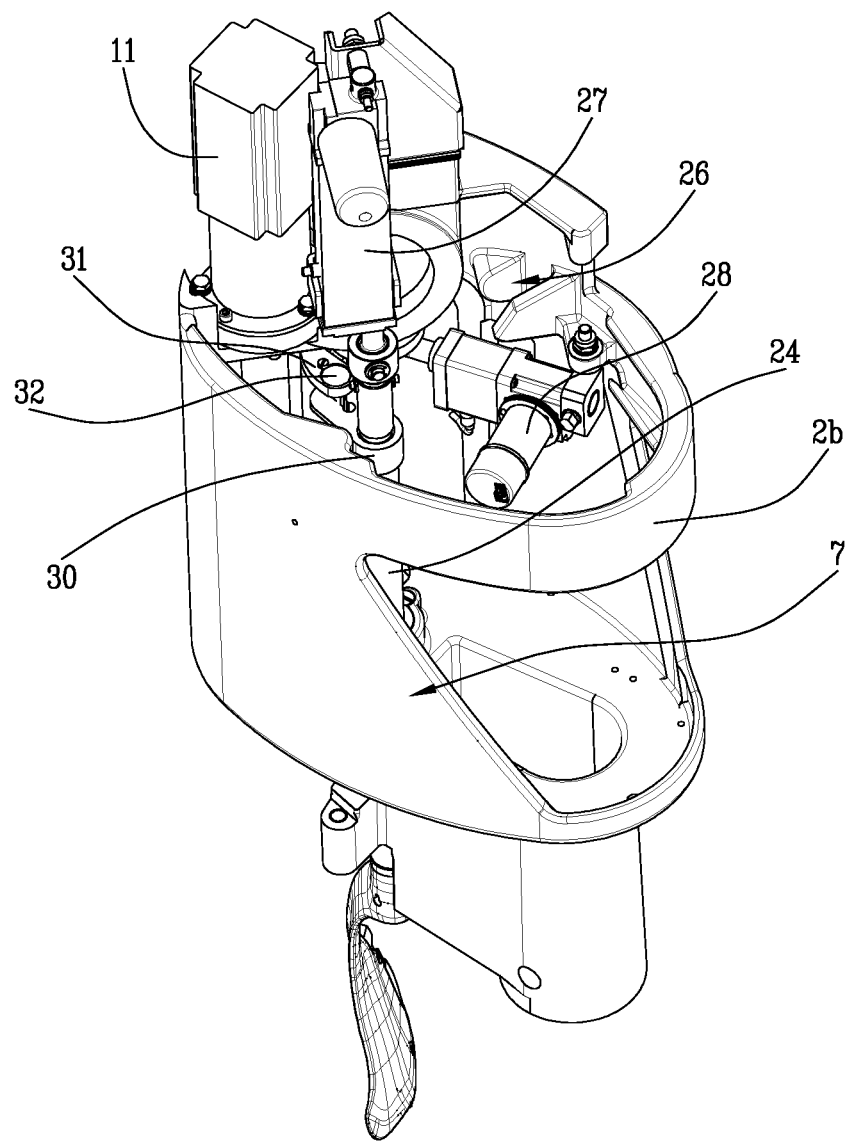
FIG. 5 illustrates a top portion of the machine of FIG. 1, with some parts cut away for clarity.

Preferably, as shown in more detail in FIG. 4, the oscillation of the driven rod 24 about the axis 24a is imparted by the second linear actuator 28 through a crank transmission 29.

The transmission 29 comprises a crank 30, which is integral with the driven rod 24, and a connecting rod 31, which is hinged, on one side, to a driving end of the second linear actuator 28 and, on the other, to the crank 30 through a hinge 32.

The hinge 32 is mounted as one with a rod 33 along which the crank 30 can move in slider-like fashion in parallel with the axis 24a.

More specifically, the rod 33 is flat and the end of the crank 30 which slides along the rod 33 has a flattened slideway 34.

The movement of the spatula 25 imparted by the second linear actuator 28 is known in jargon of the trade as "lift" and "spread". In effect, depending on the position that the spatula 25 adopts relative to the inside wall of the vessel 5, it can scrape the product being processed off the wall ("lift" function) or spread it ("spread" function).

Thanks to the two independent movements of the spatula 25 and to the rotational speed of the vessel 5, also independently controlled, it is possible to obtain many different product processes.

For example, in a cycle known as "half load" of a product consisting of ice cream, the vertical movement of the spatula 5 may be restricted to the bottom of the vessel 5.

In a cycle for processing a product consisting of a slush drink, on the other hand, the angular speed of the vessel 5 can be slowed down during the "lift" step to avoid emulsification and the angular speed of the vessel 5 can be increased during the "spread" step so that the centrifugal acceleration "spreads" the product on the inside wall of the vessel 5, thus increasing heat exchange.

The gear motor 11 and the linear actuators 27 and 28 are controlled by a control unit 35, represented schematically as a block in FIG. 3.

Preferably, the control unit 35 is housed inside the guard 2b.

The control unit 35, although not illustrated, preferably also controls the thermal unit 4.

Preferably, the control unit controls the gear motor 11 and the linear actuators 27 and 28 according to a plurality of "recipes", that is to say, according to the type of product to be processed.

According to a further advantageous aspect of this invention, as shown in FIG. 3, the gap 15 is in communication with an auxiliary tank 36 through a duct 37 along which a two-way pump 38 is mounted.

That way, it is possible to clean the vessel 5 rapidly and economically (for example, when changing over from one ice cream flavor to another) and preventing the cleaning water from freezing on account of the thermal inertia of the heat exchanger fluid (glycol). In effect, the pump 38 is used to transfer the heat exchanger fluid from the bath in the gap 15 to the tank 36 without changing the temperature of the fluid (typically −25° C.), with an obvious advantage in terms of energy saving.

When cleaning is over, the heat exchanger fluid is transferred back from the tank 36 to the bath of the vessel 8 and another production cycle can be started immediately.

The use of the pump 38 and the tank 36 also makes it possible to partialize the refrigeration (or heating) of the vessel 5 (in height) with the heat exchanger fluid at the same temperature, which is also adjustable using the control unit 35, and is therefore useful for reduced quantities of mixture (typically, half loads).

To measure the level of the heat exchanger fluid bath in the vessel 8, a battery of sensors 39 is provided, the sensors being mounted at different heights in the gap 15, specifically on the inside wall 14 of the second vessel 8, and connected to the control unit 35.

What is claimed is:

1. A machine for making liquid or semi-liquid food products, comprising:
    a frame;
    a product processing unit mounted on the frame;
    a control unit for driving the product processing unit;
    the product processing unit comprising a first vessel rotatable about a central of the first vessel and defining a product processing chamber in an interior of the first vessel;
    a stirrer including a spatula mounted inside the product processing chamber; and
    a movement unit for moving the stirrer;
    wherein the movement unit is configured for imparting to the spatula a first movement, towards and away from a bottom of the first vessel, and a second movement, towards and away from an interior wall of the first vessel, the first and second movements being independent of each other;
    wherein the movement unit comprises a first linear actuator and a second linear actuator driven by the control unit, the first and second movements being imparted by the first linear actuator and the second linear actuator, respectively;
    a driven rod, wherein the first movement and the second movement are imparted to the spatula through the driven rod; the spatula being fixed to a lower end of the driven rod and extending eccentrically from the lower end of the driven rod;
    wherein the second movement is an eccentric oscillating movement imparted by the second linear actuator which causes the driven rod to oscillate about a central axis of the driven rod;
    a crank transmission including a crank that is integral with the driven rod, and a connecting rod that is hinged, on one side, to a driving end of the second linear actuator, and on another side, to the crank through a hinge;
    the hinge being mounted integrally with a further rod along which the crank is slidably movable parallel with a central axis of the driven rod;
    the first linear actuator including a driving end that has a ball joint that presses an upper end of the driven rod.

2. The machine according to claim 1, wherein the first movement is a vertical linear movement imparted by the first linear actuator which causes the driven rod to translate along the central axis of the driven rod.

3. The machine according to claim 1, and further comprising a brushless gear motor, wherein the first vessel is driven in rotation about the central axis of the first vessel by the brushless gear motor whose speed is controlled by the control unit.

4. The machine according to claim 1, further comprising:
    a thermal unit thermally connected with the product processing unit to exchange heat therewith while the product is being processed;
    wherein the product processing unit further comprises a second vessel which is fixed to the frame and which defines a receiving chamber in an interior of the second vessel which houses the first rotating vessel;
    the first vessel being removably housed inside the second vessel and defining between an outer wall of the first vessel and an inner wall of the second vessel, a gap containing a heat exchanger fluid bath which exchanges heat with the thermal unit through the inner wall of the second vessel.

5. The machine according to claim 4, and further comprising an auxiliary tank, a duct and a two-way pump mounted along the duct, wherein the gap is in fluid communication with the auxiliary tank through the duct.

6. The machine according to claim 5, and further comprising a battery of sensors mounted at different heights in the gap, on the inner wall of the second vessel, and connected to the control unit to indicate a level of the heat exchanger fluid bath.

7. A machine for making liquid or semi-liquid food products, comprising:
    a frame;
    a product processing unit mounted on the frame;
    a control unit for driving the product processing unit;
    the product processing unit comprising a first vessel rotatable about a central axis of the first vessel and defining a product processing chamber in an interior of the first vessel;
    a stirrer including a spatula mounted inside the product processing chamber; and
    a movement unit for moving the stirrer;
    wherein the movement unit is configured for imparting to the spatula a first movement, towards and away from a bottom of the first vessel, and a second movement, towards and away from an interior wall of the first vessel, the first and second movements being independent of each other;
    a thermal unit thermally connected with the product processing unit to exchange heat therewith while the product is being processed;
    wherein the product processing unit further comprises a second vessel which is fixed to the frame and which defines a receiving chamber in an interior of the second vessel which houses the first rotating vessel;
    the first vessel being removably housed inside the second vessel and defining between an outer wall of the first vessel and an inner wall of the second vessel, a gap containing a heat exchanger fluid bath which exchanges heat with the thermal unit through the inner wall of the second vessel;
    an auxiliary tank, a duct and a two-way pump mounted along the duct, wherein the gap is in fluid communication with the auxiliary tank through the duct;

a battery of sensors mounted at different heights in the gap, on the inner wall of the second vessel, and connected to the control unit to indicate a level of the heat exchanger fluid bath.

* * * * *